(12) United States Patent
Baur

(10) Patent No.: US 10,384,610 B2
(45) Date of Patent: *Aug. 20, 2019

(54) REARVIEW VISION SYSTEM FOR VEHICLE

(71) Applicant: MAGNA MIRRORS OF AMERICA, INC., Holland, MI (US)

(72) Inventor: Michael J. Baur, Kentwood, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 61 days.

This patent is subject to a terminal disclaimer.

(21) Appl. No.: 15/810,207

(22) Filed: Nov. 13, 2017

(65) Prior Publication Data

US 2018/0065554 A1    Mar. 8, 2018

Related U.S. Application Data

(63) Continuation of application No. 14/272,833, filed on May 8, 2014, now Pat. No. 9,815,409.

(60) Provisional application No. 61/821,458, filed on May 9, 2013.

(51) Int. Cl.
*B60R 1/00* (2006.01)
*B60R 1/12* (2006.01)
*B60R 1/06* (2006.01)

(52) U.S. Cl.
CPC ............... *B60R 1/00* (2013.01); *B60R 1/06* (2013.01); *B60R 1/12* (2013.01); *B60R 2001/1253* (2013.01); *B60R 2300/20* (2013.01); *B60R 2300/8066* (2013.01)

(58) Field of Classification Search
CPC ..................................... B60R 1/00; B60R 1/06
See application file for complete search history.

(56) References Cited

U.S. PATENT DOCUMENTS

| | | |
|---|---|---|
| 2,010,138 A | 8/1935 | Condon |
| 2,263,382 A | 11/1941 | Gotzinger et al. |
| 2,580,014 A | 12/1951 | Gazda |
| 3,266,016 A | 8/1966 | Maruyama et al. |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,721,364 A | 1/1988 | Itoh et al. |

(Continued)

FOREIGN PATENT DOCUMENTS

DE    20010180    10/2000

*Primary Examiner* — Rowina J Cattungal
(74) *Attorney, Agent, or Firm* — Honigman LLP

(57) ABSTRACT

A rearview vision system for a vehicle includes a camera module disposed at a side portion of the vehicle. The camera module includes a casing, a reflective element disposed in the casing, and a camera disposed in the casing and having a field of view that encompasses at least a portion of the reflective element. The camera module is disposed at the side portion of the vehicle so that images of the exterior scene occurring to the side and rear of the vehicle are reflected off of the reflective element and image data representative of the reflected images is captured by the camera. A display device displays images derived from the captured image data representative of the reflected images so as to provide a sideward and rearward field of view to the driver when the driver is viewing the display device.

20 Claims, 2 Drawing Sheets

R= Radius of convex
F= Focal length $d_0$ = distance of object from mirror
$h_0$ = height of object
$d_i$ = distance of virtual image
$h_i$ = height of virtual object

(56) References Cited

U.S. PATENT DOCUMENTS

| | | |
|---|---|---|
| 4,793,690 A | 12/1988 | Gahan et al. |
| 4,799,768 A | 1/1989 | Gahan |
| 4,906,085 A | 3/1990 | Sugihara et al. |
| 4,917,477 A | 4/1990 | Bechtel et al. |
| 4,951,179 A | 8/1990 | Machida |
| 5,014,167 A | 5/1991 | Roberts |
| 5,189,537 A | 2/1993 | O'Farrell |
| 5,207,492 A | 5/1993 | Roberts |
| 5,289,321 A | 2/1994 | Secor |
| 5,313,335 A | 5/1994 | Gray et al. |
| 5,340,503 A | 8/1994 | Varaprasad et al. |
| 5,355,284 A | 10/1994 | Roberts |
| 5,371,659 A | 12/1994 | Pastrick et al. |
| 5,436,741 A | 7/1995 | Crandall |
| 5,438,487 A | 8/1995 | Schmid et al. |
| 5,481,409 A | 1/1996 | Roberts |
| 5,497,306 A | 3/1996 | Pastrick |
| 5,528,422 A | 6/1996 | Roberts |
| 5,530,240 A | 6/1996 | Larson et al. |
| 5,535,056 A | 7/1996 | Caskey et al. |
| 5,550,677 A | 8/1996 | Schofield et al. |
| 5,575,552 A | 11/1996 | Faloon et al. |
| 5,587,699 A | 12/1996 | Faloon et al. |
| 5,594,593 A | 1/1997 | Milner et al. |
| 5,617,245 A | 4/1997 | Milner et al. |
| 5,668,663 A | 9/1997 | Varaprasad et al. |
| 5,669,699 A | 9/1997 | Pastrick et al. |
| 5,670,935 A | 9/1997 | Schofield et al. |
| 5,724,187 A | 3/1998 | Varaprasad et al. |
| 5,751,489 A | 5/1998 | Caskey et al. |
| 5,760,962 A | 6/1998 | Schofield et al. |
| 5,774,283 A | 6/1998 | Nagel et al. |
| 5,786,772 A | 7/1998 | Schofield et al. |
| 5,788,357 A | 8/1998 | Muth et al. |
| 5,796,094 A | 8/1998 | Schofield et al. |
| 5,823,654 A | 10/1998 | Pastrick et al. |
| 5,914,815 A | 6/1999 | Bos et al. |
| 5,929,786 A | 7/1999 | Schofield et al. |
| 5,938,320 A | 8/1999 | Crandall |
| 6,005,724 A | 12/1999 | Todd |
| 6,045,243 A | 4/2000 | Muth et al. |
| 6,065,840 A | 5/2000 | Caskey et al. |
| 6,076,948 A | 6/2000 | Bukosky et al. |
| 6,097,023 A | 8/2000 | Schofield et al. |
| 6,111,683 A | 8/2000 | Cammenga et al. |
| 6,175,300 B1 | 1/2001 | Kendrick |
| 6,176,602 B1 | 1/2001 | Pastrick et al. |
| 6,196,688 B1 | 3/2001 | Caskey et al. |
| 6,198,409 B1 | 3/2001 | Schofield et al. |
| 6,227,689 B1 | 5/2001 | Miller |
| 6,243,218 B1 | 6/2001 | Whitehead |
| 6,257,746 B1 | 7/2001 | Todd et al. |
| 6,264,353 B1 | 7/2001 | Caraher et al. |
| 6,276,821 B1 | 8/2001 | Pastrick et al. |
| 6,286,965 B1 | 9/2001 | Caskey et al. |
| 6,310,738 B1 | 10/2001 | Chu |
| 6,329,925 B1 | 12/2001 | Skiver et al. |
| 6,356,376 B1 | 3/2002 | Tonar et al. |
| 6,396,397 B1 | 5/2002 | Bos et al. |
| 6,447,130 B2 | 9/2002 | Chu |
| 6,467,920 B2 | 10/2002 | Schnell et al. |
| 6,512,624 B2 | 1/2003 | Tonar et al. |
| 6,582,109 B2 | 6/2003 | Miller |
| 6,598,982 B2 | 7/2003 | Witt |
| 6,612,708 B2 | 9/2003 | Chu |
| 6,616,314 B2 | 9/2003 | Thau |
| 6,669,267 B1 | 12/2003 | Lynam et al. |
| 6,690,268 B2 | 2/2004 | Schofield et al. |
| 6,700,692 B2 | 3/2004 | Tonar et al. |
| 6,717,610 B1 | 4/2004 | Bos et al. |
| 6,755,544 B2 | 6/2004 | Schnell et al. |
| 6,824,281 B2 | 11/2004 | Schofield et al. |
| 6,855,431 B2 | 2/2005 | Varaprasad et al. |
| 6,882,287 B2 | 4/2005 | Schofield |
| 6,902,284 B2 | 6/2005 | Hutzel et al. |
| 6,969,101 B2 | 11/2005 | Lynam et al. |
| 7,038,577 B2 | 5/2006 | Pawlicki et al. |
| 7,083,312 B2 | 8/2006 | Pastrick et al. |
| 7,184,190 B2 | 2/2007 | McCabe et al. |
| 7,188,963 B2 | 3/2007 | Schofield et al. |
| 7,195,381 B2 | 3/2007 | Lynam et al. |
| 7,199,767 B2 * | 4/2007 | Spero ................ G02B 5/20 250/203.4 |
| 7,224,324 B2 | 5/2007 | Quist et al. |
| 7,241,037 B2 | 7/2007 | Mathieu et al. |
| 7,253,723 B2 | 8/2007 | Lundahl et al. |
| 7,255,451 B2 | 8/2007 | McCabe et al. |
| 7,274,501 B2 | 9/2007 | McCabe et al. |
| 7,338,177 B2 | 3/2008 | Lynam |
| 7,370,983 B2 | 5/2008 | DeWind et al. |
| 7,404,654 B2 | 7/2008 | Lueftner |
| 7,446,650 B2 | 11/2008 | Schofield et al. |
| 7,492,281 B2 | 2/2009 | Lynam et al. |
| 7,581,859 B2 | 9/2009 | Lynam |
| 7,594,823 B2 | 9/2009 | Moscovitch |
| 7,626,749 B2 | 12/2009 | Baur et al. |
| 7,720,580 B2 | 5/2010 | Higgins-Luthman |
| 7,777,611 B2 | 8/2010 | Desai |
| 7,855,755 B2 | 12/2010 | Weller et al. |
| 7,881,496 B2 | 2/2011 | Camilleri et al. |
| 7,965,336 B2 | 6/2011 | Bingle et al. |
| 8,154,418 B2 | 4/2012 | Peterson et al. |
| 8,331,038 B1 | 12/2012 | Snow et al. |
| 8,506,096 B2 | 8/2013 | McCabe et al. |
| 8,730,553 B2 | 5/2014 | DeWind et al. |
| 8,786,704 B2 | 7/2014 | Foote et al. |
| 8,917,437 B2 * | 12/2014 | Baur ................ B60R 1/082 359/267 |
| 9,041,806 B2 | 5/2015 | Baur et al. |
| 9,126,525 B2 | 9/2015 | Lynam et al. |
| 9,815,409 B2 | 11/2017 | Baur |
| 2002/0003571 A1 * | 1/2002 | Schofield ............ B60C 23/00 348/148 |
| 2005/0146604 A1 | 7/2005 | Shinada |
| 2006/0050018 A1 | 3/2006 | Hutzel et al. |
| 2006/0061008 A1 | 3/2006 | Karner et al. |
| 2006/0181772 A1 | 8/2006 | Byers et al. |
| 2006/0184297 A1 | 8/2006 | Higgins-Luthman |
| 2007/0058257 A1 | 3/2007 | Lynam |
| 2008/0007428 A1 | 1/2008 | Watanabe et al. |
| 2008/0106389 A1 | 5/2008 | Desai |
| 2008/0149796 A1 | 6/2008 | Moscovitch |
| 2008/0309764 A1 | 12/2008 | Kubota et al. |
| 2012/0162427 A1 | 6/2012 | Lynam |
| 2012/0274770 A1 | 11/2012 | Lee |
| 2012/0287232 A1 * | 11/2012 | Natroshvili ............ G06T 7/33 348/36 |
| 2013/0155236 A1 * | 6/2013 | Ramdeo ............ H04N 7/183 348/148 |
| 2014/0022390 A1 | 1/2014 | Blank et al. |
| 2014/0114534 A1 * | 4/2014 | Zhang ................ B60R 1/00 701/42 |
| 2014/0160284 A1 | 6/2014 | Achenbach et al. |
| 2014/0285666 A1 * | 9/2014 | O'Connell ............ B60R 1/00 348/148 |
| 2014/0293169 A1 | 10/2014 | Uken et al. |
| 2015/0022664 A1 | 1/2015 | Pflug |
| 2015/0049193 A1 | 2/2015 | Gupta et al. |

* cited by examiner

R = Radius of convex
F = Focal length $d_o$ = distance of object from mirror
$h_o$ = height of object
$d_i$ = distance of virtual image
$h_i$ = height of virtual object

REARVIEW VISION SYSTEM FOR VEHICLE

CROSS REFERENCE TO RELATED APPLICATION

The present application is a continuation of U.S. patent application Ser. No. 14/272,833, filed May 8, 2014, now U.S. Pat. No. 9,815,409, which claims the filing benefits of U.S. provisional application Ser. No. 61/821,458, filed May 9, 2013, which is hereby incorporated herein by reference in its entirety.

FIELD OF THE INVENTION

The present invention relates generally to the field of exterior rearview systems for vehicles.

BACKGROUND OF THE INVENTION

It is known to provide an automotive rearview mirror assembly that provides a rearview at the side and rear of a vehicle to a driver of the vehicle. It is also known to provide a rear vision system that utilizes rearward facing cameras that capture images of the side and rear areas of the vehicle for display of the captured images to the driver of the vehicle.

SUMMARY OF THE INVENTION

The present invention provides a rearview mirror assembly (such as an exterior mirror assembly mounted at a side of an equipped vehicle) that includes a camera at a side of the vehicle, with the camera having a field of view that encompasses a mirror reflective element, which reflects a rearward field of view towards the camera. Because the camera is disposed close to the reflective element, the reflective element provides a wide angle field of view to the camera. Also, because the camera is disposed close to the reflective element, the camera and reflective element may be provided as a relatively small modular device. Optionally, the mirror reflective element may comprise a curved surface to provide a wider angle view to the camera. Optionally, the camera and/or the camera and mirror module may be adjustable to adjust the viewing direction of the system, such as for a rearward viewing system and/or a generally downwardly and/or sidewardly viewing system.

These and other objects, advantages, purposes and features of the present invention will become apparent upon review of the following specification in conjunction with the drawings.

DESCRIPTION OF THE PREFERRED EMBODIMENTS

Figure 1:
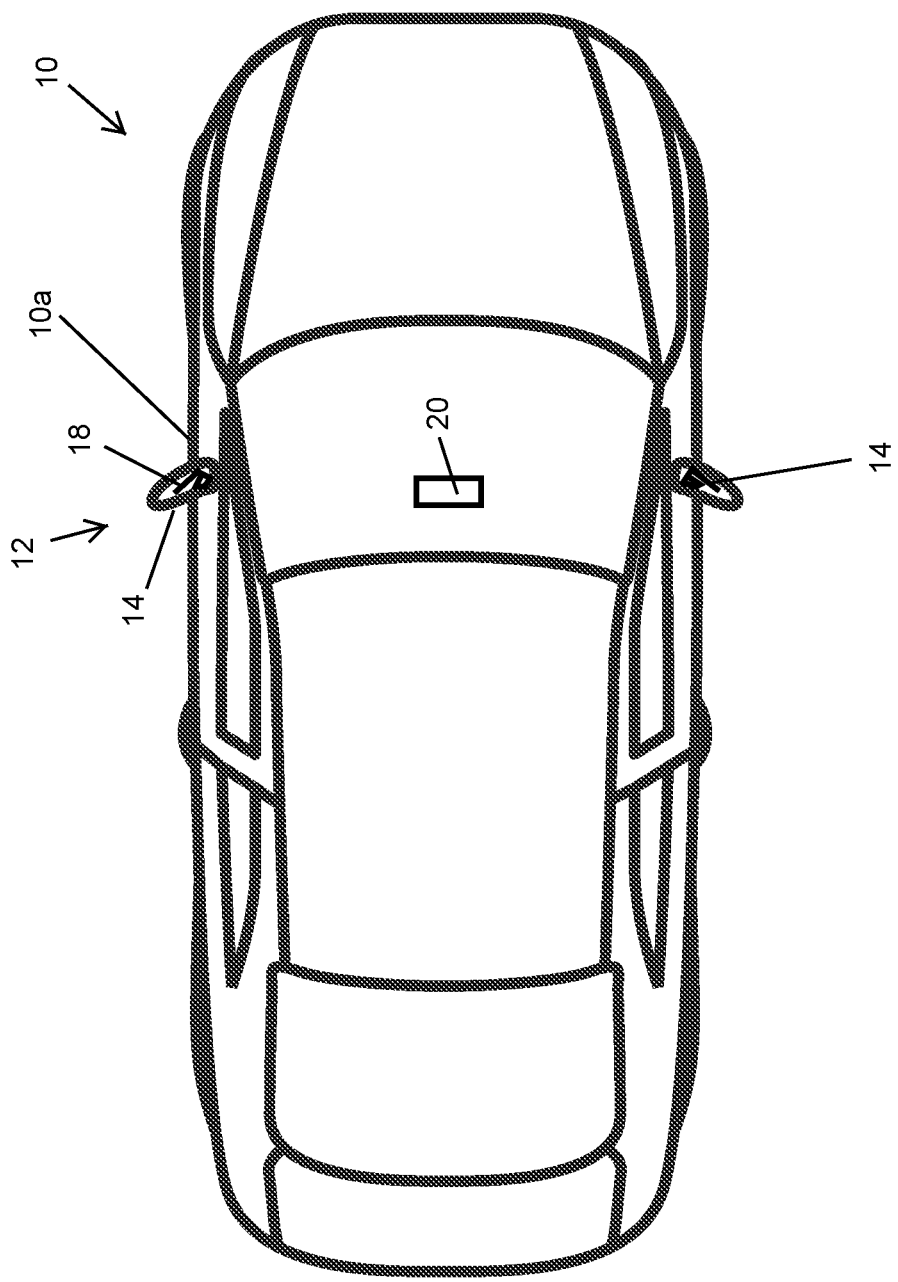
FIG. 1 is a plan view of a vehicle having a rearvision system in accordance with the present invention.
Figure 2:
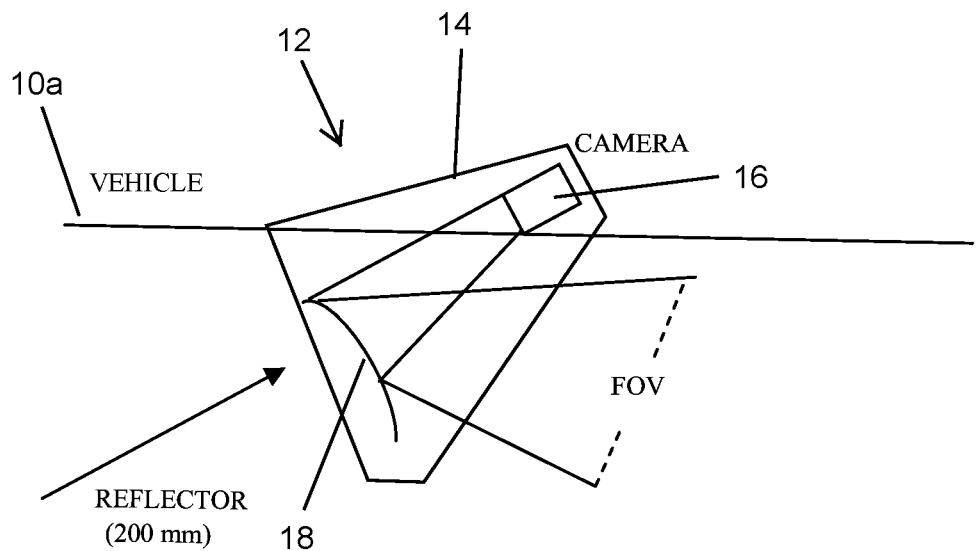
FIG. 2 is a schematic of a rearvision module having a camera and reflective element in accordance with the present invention.

Referring now to the drawings and the illustrative embodiments depicted therein, a vehicle 10 includes a rearvision system 12 that is operable to capture images rearward and sideward of the vehicle for display of captured images for viewing by the driver of the vehicle (FIGS. 1 and 2). The rearvision system 12 includes a rearvision device or module 14 at a side 10a of the vehicle 10 (such as at the driver side and/or at the passenger side of the vehicle). The rearvision device 14 includes an image sensor or camera 16 and a reflective element 18 (such as a flat glass reflective element or a curved or bent glass reflective element, with a mirror reflector established at a surface thereof). As shown in FIG. 2, the camera 16 is disposed proximate to and generally facing the reflective element 18, whereby the field of view of the camera encompasses the reflective element. The rearvision device or module 14 is disposed at the vehicle such that the camera is facing generally sidewardly and forwardly, with the mirror reflective element angled relative to the vehicle and to the camera so that the images reflected towards the camera for viewing and image capture by the camera are images of the area or region generally sidewardly and rearwardly of the vehicle, as discussed below. The captured images are communicated to a processor and/or display device 20 of the vehicle to display video images of the scene sideward and rearward of the vehicle to the driver of the vehicle while the driver is normally operating the vehicle. The display device 20 may be at the interior rearview mirror assembly of the vehicle or may comprise a console display or door mounted display or the like, whereby the displayed images are readily viewable by the driver of the vehicle while the driver is normally operating the vehicle.

In accordance with the present invention, a benefit can be achieved using mirror constructions where the portion of the overall mirror assembly exterior of the vehicle (and thus in the vehicle slipstream so as to add to aerodynamic drag and the like), is reduced or minimized, such as by utilizing aspects of the mirror systems described in U.S. Pat. Nos. 8,331,038; 5,914,815; 5,617,245 and/or 5,594,593, which are hereby incorporated herein by reference in their entireties, and where the placement and packaging of the camera is interior of the vehicle and thus not directly subject to external weather conditions, car washes and/or the like.

There have been many efforts to enhance vehicle visibility through the use of camera monitoring systems as well as through the use of additional specialized mirrors. Examples in the market today include backup/reverse aid cameras for camera monitoring systems and blind zone mirrors and/or the like. Efforts to completely replace mirrors with cameras have continued to take place as well. Examples of such proposed camera/mirror constructions are described in U.S. Pat. Nos. 5,550,677; 5,760,962 and/or 5,670,935, which are hereby incorporated herein by reference in their entireties.

Mirror system requirements have long been known. Most areas of the world require a set of performance expectations to define not only what must be seen (field of view) by the driver of the vehicle, but also how it must be seen (magnification factor). A problem arises when attempting to replace a traditional outside mirror system with a camera monitoring system.

For a traditional driver side exterior rearview mirror assembly of a vehicle, the magnification factor is defined. In the U.S., the requirement is unit magnification of the images reflected by the reflective element of a driver side exterior rearview mirror assembly. In the EU, the requirement is inherent in the requirement for a minimum bend radius of 1020 mm. These factors in combination with the required field of view (FOV) and the distance from the driver's eyes or ocular reception points define the parameters for the exterior rearview mirror design.

The bend radius of a convex mirror is twice the focal lengths $$f = \frac{R}{z},$$

where f represents the focal length and R reflects the radius of curvature.

Figure 3:
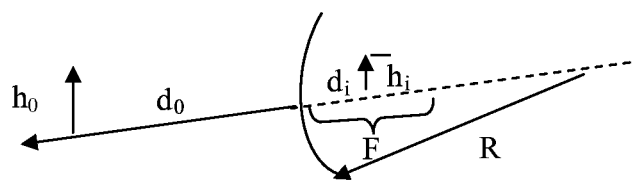
FIG. 3 is a schematic showing the relationship of the distances of an object and virtual image of an object to the mirror and camera of the present invention.

The size of an image in a convex mirror is defined from the relationship shown in FIG. 3. By virtue of known equations, object sizes are related by an inverted sum equation:

$$\frac{1}{f} = \frac{1}{d_0} + \frac{1}{t_i}$$

Further magnification can be defined as the object height do versus the image height $d_2$ or:

$$M = \frac{d_i}{d_0}$$

In a constant bend radius of around 1200 mm or thereabouts, the focal length is fixed at approximately 600 mm. Therefore:

$$\frac{1}{600 \text{ mm}} = \frac{1}{d_0} + \frac{1}{d_i} \text{ and}$$

$$1 = \frac{600}{d_0} + \frac{600}{d_i} \text{ and}$$

$$1 - \frac{600}{d_0} + \frac{600}{d_i} \text{ and}$$

$$\frac{1}{1 - \frac{600}{d_0}} = \frac{d_i}{600} \text{ and}$$

$$\frac{600}{1 - \frac{600}{d_0}} = d_i \text{ and since}$$

$$M = \frac{d_i}{d_0} \text{ then}$$

$$M = \frac{1 - \left[\frac{600}{600}\right]}{d_0}$$

Therefore, magnification in a convex mirror system is a function of do and is not constant.

Thus, when cameras are arranged to replace a mirror directly, the lens and digital connection factors are specifically designed to accommodate a given field of view. Typically, these requirements for the field of view dictate that the camera lens has a very small radius relative to the radius used on a conventional mirror system. Typically, these focal lengths can be as small as about 5 mm (as compared to about 600 mm for a mirror system). The U.S. requires unit magnification for driver side exterior mirror assemblies, which requires an infinite bend radius or radius of curvature for the mirror reflective element.

Because the lens functions very similar to the mirror, by other known equations, the magnification also varies according to $d_0$.

Therefore, the problem arises because the short focal length of a camera has a drastically different change in magnification than does a mirror system for the same change in $d_0$ (distance of an object to the mirror).

For a given $\Delta d_0 \Rightarrow \Delta M_{CAMERA} \rangle\rangle \Delta M_{MIRROR}$ Considering that mirrors are used for viewing many objects at many distances from the vehicle, the magnification of a camera cannot be made to match the magnification of a mirror in a practical application.

This problem can be overcome however through the use of other optics. In the simplest case, and as best shown in FIG. 2, the problem can be overcome by the system of the present invention, which uses a camera 16 that has its field of view at and focuses at an image reflected by a mirror reflector or reflective element 18 (which may be generally flat or curved or bent) rather than having its field of view directly rearward towards the image that is to be captured.

In this case, the image magnification will be defined by the distance ($d_0$) of the object from the reflective surface of the reflective element disposed in front of the camera. Therefore, the magnification relative to a range of distances do will change as a function of the reflector. This will also be the case if the reflector is flat (having unit magnification).

Practically, the image captured by the camera is a function of how far the camera is from the reflector (for any given camera). For example, the closer the camera is to the reflector, the larger will be the field of view of the camera rearward of the vehicle.

Thus, to replace the automotive exterior rearview mirror, a small package or module can be developed incorporating these concepts. The module may be disposed at a side of a vehicle and may only slightly protrude from the side of the vehicle, with the mirror reflector partially outside of the vehicle and the camera inside of the vehicle (or both inside of the vehicle or both outside of the vehicle), such as shown in FIG. 2. The curvature or flatness of the reflective element and the distance between the imager and the reflective element and the arrangement or orientation of the imager and reflective element at the side of the vehicle are selected to provide the desired rearward field of view of the camera to provide the desired captured images for display to the driver of the vehicle.

The desired rearward field of view may also be possible to achieve with optical elements such as prisms, fiber optics and/or the like. Although shown and described as being used to replace an exterior rearview mirror assembly of a vehicle, the present invention may be suitable for interior mirror applications or replacement as well. Optionally, the module or system may use a compound mirror, such as a double mirror or the like.

The camera thus is disposed in close proximity to the reflective element to provide a reduced size rearview mirror or vision system. For example, whereas a driver's eye may be a meter or more from the mirror reflective element of an exterior rearview mirror assembly, the camera 16 (such as shown in FIG. 2) is preferably within 15 cm, more preferably within 10 cm and more preferably within 5 cm, of the reflective element 18. Images captured by camera 16 are conveyed as an analog data stream and/or digital data stream (such as via a twisted wire pair and/or a vehicle network bus or the like) to the display screen, such as a video mirror display or an in-dash or in-counsel video screen, which may be a meter or so away from the driver's eyes. Because of the close proximity of the camera to the reflective element, the overall dimensions of the reflective element 18 (and the vision system module or assembly or device) can be significantly reduced.

Thus, camera 16 captures video images of the rearward scene as reflected by the reflective element 18 and, as indicated previously, because camera 16 is relatively close to the reflective element 18, the reflective element is correspondingly reduced in dimension as compared to the conventional size of a mirror reflective element of an exterior rearview mirror assembly being conventionally viewed from at least about one meter away by the driver of the vehicle while normally operating and driving the vehicle. Because the camera captures video images of the reflective element 18, the video images or data output by the camera can be displayed, for example, on a seven inch diagonal or larger in-console video screen (or in an around 4-4.5 inch diagonal video mirror display screen or the like) and thus the present invention allows use of a much smaller exterior mirror construction, while enabling a full-scale/large video display (presented for viewing by the driver). The smaller exterior mirror or camera/mirror casing provides for reduced aerodynamic drag at the side of the vehicle and may provide for enhanced styling at the side of the vehicle.

The camera thus captures images reflected off of the reflector and may communicate captured images or image data to a processor and/or display, which may be disposed inside the vehicle and remote from the vision system module or optionally that may be disposed at the interior side of the door at or near or associated with the vision system module (such as by utilizing aspects of the display systems described in International Publication No. WO 2013/067082, which is hereby incorporated herein by reference in its entirety). The driver thus can view the displayed video images as captured by the camera to view rearward of the vehicle. Optionally, the reflective element and vision system may utilize aspects of the mirror systems described in U.S. patent application Ser. No. 13/942,751, filed Jul. 16, 2013, now U.S. Pat. No. 8,917,437, which is hereby incorporated herein by reference in its entirety. Optionally, the vision system may utilize aspects of the vision systems described in U.S. Pat. No. 6,717,610, which is hereby incorporated herein by reference in its entirety. The reflective element may comprise a generally planar reflective element or a slightly curved reflective element (where the reflective element may have a selected radius of curvature to provide a wider angle field of view rearward and at the side of the vehicle), depending on the particular application of the mirror and camera system and the desired rearward field of view displayed for viewing by the driver of the vehicle.

Optionally, the driver may adjust the field of view of the camera, such as via a user input or toggle in the vehicle, which may adjust the camera position or angle or orientation and/or the reflector position or angle or orientation relative to the camera, in order to adjust the rearward field of view of the camera relative to the side of the vehicle at which the module is mounted. Optionally, the system may, responsive to a user input or the like, digitally or electronically adjust the displayed field of view, such as by panning or zooming in/out or the like, to provide the desired displayed image or images for viewing by the driver of the vehicle during normal operation of the vehicle. Optionally, the system may, responsive to a detection of a vehicle or object at the side lane adjacent to the vehicle, adjust the displayed image to show the detected object or vehicle (such as by zooming in on the detected object or vehicle), such as in response to the driver actuating a turn signal indicator towards that side of the vehicle, in order to alert the driver of a potential hazard in changing lanes. Optionally, the reflective element may be curved to provide a wider angle field of view and the displayed images may be processed and/or displayed in a manner with reduced distortion so as to provide a substantially non-distorted rearward field of view to the driver of the vehicle.

Optionally, the mirror reflective element may be oriented at the side of the vehicle to provide a generally rearward field of view along the side of the vehicle and rearward of the vehicle, such as for capturing images by the camera of the rearward field of view for display to the driver during normal driving maneuvers (such as when driving forwardly along a road and during lane change maneuvers and the like). Optionally, the mirror reflective element may be oriented to provide a generally downward field of view at the side of the vehicle, such as for capturing images by the camera of the area at and immediately adjacent the side of the vehicle, such as for capturing images for use in a surround vision display or the like. Optionally, the camera and reflective element construction or module may be adjustable to adjust the orientation to provide the desired field of view, such as responsive to a user input or responsive to a control that selects the orientation responsive to an input. For example, the control may select the rearward field of view when the vehicle is traveling forward at a speed above a threshold speed and may select the downward field of view when the vehicle is traveling forward or reverse at a speed below a threshold speed (such as during a parking maneuver where the surround view display may be used by the driver). Optionally, when used in its generally sideward and rearward viewing orientation, image data captured by the camera may be used by a side object detection system or blind zone detection system or lane change assist system or the like, while, when used in its generally downwardly viewing orientation, image data captured by the camera may be used for displaying a surround view display or bird's eye view display of the area at and immediately surrounding the vehicle.

The camera and reflective element construction or module may pivot about a generally horizontal pivot axis to provide the selected or desired or appropriate field of view of the camera. Optionally, the reflective element may comprise a fixed curved construction (such as a partial spherical shape) and the camera may pivot or rotate about the fixed reflective element to adjust the field of view imaged by the camera.

The camera or sensor may comprise any type of imaging sensor or sensors, and may capture image data for image processing and/or display of video images, and may comprise any suitable camera or sensing device, such as, for example, an array of a plurality of photosensor elements arranged in at least 640 columns and 480 rows (at least a 640×480 imaging array, such as a megapixel imaging array or the like), with a respective lens focusing images onto respective portions of the array. The vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, which are all hereby incorporated herein by reference in their entireties.

Optionally, the vision system module and/or the exterior mirror assembly may incorporate a blind spot indicator device or element and/or a turn signal indicator device or element, such as by utilizing aspects of the devices described in U.S. provisional applications, and/or U.S. Pat. Nos. 8,058,977; 7,944,371; 7,626,749; 7,492,281; 7,255,451; 6,198,409; 5,929,786 and 5,786,772, and/or U.S. patent application Ser. No. 12/187,725, filed Aug. 7, 2008, now U.S. Pat. No. 8,786,704, and/or PCT Application No. PCT/US2006/026148, filed Jul. 5, 2006, and/or PCT Application No. PCT/US07/82099, filed Oct. 22, 2007, which are hereby incorporated herein by reference in their entireties. The signal indicator or indication module may include or utilize aspects of various light modules or systems or devices, such as the types described in U.S. Pat. Nos. 7,581,859; 7,289,037; 6,227,689; 6,582,109; 5,371,659; 5,497,306; 5,669,699; 5,823,654; 6,176,602 and/or 6,276,821, and/or U.S. patent application Ser. No. 11/226,628, filed Sep. 14, 2005 and published Mar. 23, 2006 as U.S. Publication No. US-2006-0061008, and/or PCT Application No. PCT/US2006/018567, filed May 16, 2006 and published Nov. 23, 2006 as International Publication No. WO 2006/124682, which are hereby incorporated herein by reference in their entireties. Optionally, the exterior rearview mirror assembly may include a wide angle reflector at or integral with the reflective element, such as by utilizing aspects of the elements described in U.S. Pat. Nos. 7,748,856; 7,255,451; 7,195,381; 6,717,712; 7,126,456; 6,315,419; 7,097,312 and/or 6,522,451, which are hereby incorporated herein by reference in their entireties.

Optionally, the vision system module and/or exterior casing or housing at the side of the vehicle may also comprise a ground illumination light or puddle lamp, which provides downwardly directed illumination (and which may provide a back lit icon or indicia or logo or the like), such as by utilizing aspects of the illumination systems described in U.S. Pat. Nos. 8,333,492; 5,371,659, 5,669,699, 5,823,654 and 5,497,305, and/or U.S. patent application Ser. No. 13/249,433, filed Sep. 30, 2011, now U.S. Pat. No. 8,764,256, which are hereby incorporated herein by reference in their entireties. Optionally, the module and/or casing may comprise a cornering light and a puddle lamp and turn signal light, and may have a wrap-around style turn signal at the exterior mirror that may be fitted with a prism lens or the like to project light in the appropriate direction and/or toward the targeted location. The module and/or casing thus may include one or more illumination sources and one or more lenses or optics or light pipes or the like to distribute or direct illumination toward the appropriate targeted areas.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,038,577; 6,882,287; 6,198,409; 5,929,786; 5,786,772 and/or 7,720,580, and/or PCT Application No. PCT/US2006/026148, filed Jul. 5, 2006, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

The blind spot indicators thus may be operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,038,577; 6,882,287; 6,198,409; 5,929,786; 5,786,772; 7,881,496 and/or 7,720,580, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610 6,757,109 and/or 7,005,974, and/or of the automatic headlamp controls described in U.S. Pat. Nos. 5,796,094; 5,715,093 and/or 7,526,103, and/or of the rain sensors described in U.S. Pat. Nos. 6,250,148 and/or 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and/or 5,796,094, and/or PCT Application No. PCT/US2003/036177 filed Nov. 14, 2003, published Jun. 3, 2004 as PCT Publication No. WO 2004/047421, with all of the above referenced U.S. patents, patent applications and provisional applications and PCT applications being hereby incorporated herein by reference in their entireties.

Optionally, the mirror assembly may include or may be associated with one or more displays (such as a display inside the vehicle for displaying images captured by the camera or cameras), such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. patent application Ser. No. 13/023,750, filed Feb. 9, 2011, now U.S. Pat. No. 8,890,955, Ser. No. 11/226,628, filed Sep. 14, 2005 and published Mar. 23, 2006 as U.S. Pat. Pub. No. US-2006-0061008, and/or Ser. No. 10/538,724, filed Jun. 13, 2005 and published Mar. 9, 2006 as U.S. Pat. Pub. No. US-2006-0050018, Ser. No. 12/091,525, filed Apr. 25, 2008 and published Jan. 15, 2009 as U.S. Pat. Pub. No. US-2009-0015736; Ser. No. 12/091,525, filed Apr. 25, 2008 and published Jan. 15, 2009 as U.S. Pat. Pub. No. US-2009-0015736; Ser. No. 12/578,732, filed Oct. 14, 2009 and published Apr. 22, 2010 as U.S. Pat. Pub. No. US-2010-0097469; Ser. No. 09/585,379, filed Jun. 1, 2000, now abandoned, and/or Ser. No. 10/207,291, filed Jul. 29, 2002, now abandoned, and/or PCT Application No. PCT/US10/47256, filed Aug. 31, 2010, which are all hereby incorporated herein by reference in their entireties.

Optionally, the exterior assembly or module may include a camera or imaging sensor that may be part of a multi-camera system, such as an object detection system or a surround view or "bird's eye view" display system or a Japan View™ vision system or the like (now common in exterior mirrors used in Japan where a video camera is located in the exterior mirror assembly at the side of a vehicle and viewing generally downwardly to allow the driver of the vehicle to view on an interior-cabin mounted video screen whether the likes of a child might be present in the blindzone to the side of the vehicle), such as by utilizing aspects of the vision systems described in U.S. patent application Ser. No. 13/333,337, filed Dec. 21, 2011, now U.S. Pat. No. 9,264,672, and/or PCT Application No. PCT/US10/25545, filed Feb. 26, 2010 and published Sep. 2, 2010 as International Publication No. WO 2010/099416, and/or International Publication Nos. WO 2011/028686; WO 2012/145822; WO 2012/075250; WO 2013/019795; WO 2012-075250; WO 2013/081985; WO 2013/086249 and/or WO 2013/109869, which are hereby incorporated herein by reference in their entireties. Thus, the multi-camera vision system may provide a video display of images captured by an exterior mirror-mounted camera and may function to detect the presence of an object or child or the like at the side of the vehicle (and/or forwardly and/or rearward of the vehicle). The light module of the present invention can be used in conjunction with such a vision system to have its principal illumination beam directed towards the area within the field of view of the camera to enhance imaging and/or to enhance detection and/or identification and/or interrogation of objects in the camera's field of view generally at the side of the vehicle and optionally forwardly and/or rearwardly of the vehicle.

The mirror reflector or reflective element may comprise any suitable construction, such as, for example, a mirror assembly with the reflective element being nested in the mirror casing and with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or International Publication Nos. WO 2010/124064; WO 2011/044312; WO 2012/051500; WO 2013/071070 and/or WO 2013/126719, which are all hereby incorporated herein by reference in their entireties (and with electrochromic and prismatic mirrors of such construction are commercially available from the assignee of this application under the trade name INFINITY™ mirror).

Changes and modifications in the specifically described embodiments may be carried out without departing from the principles of the present invention, which is intended to be limited only by the scope of the appended claims as interpreted according to the principles of patent law.

The invention claimed is:

1. A rearview vision system for a vehicle, the vehicle having a front portion, a driver side portion, a passenger side portion and a rear portion, the driver side portion having at least one driver side entrance door and the passenger side portion having at least one passenger side entrance door, said rearview vision system comprising:
   a camera module disposed at a side portion of the vehicle, the side portion comprising one of the driver side portion of the vehicle and the passenger side portion of the vehicle;
   wherein said camera module comprises a casing disposed at the vehicle body at the side portion of the vehicle;
   wherein said camera module comprises a reflective element disposed in said casing;
   wherein said camera module comprises a camera disposed in said casing and having a field of view that encompasses at least a portion of said reflective element, and wherein said camera is disposed within 15 cm of said reflective element;
   wherein said reflective element comprises a curved surface viewed by said camera to provide a wide angle field of view of the area sideward and rearward of the vehicle;
   a display device that is viewable by a driver of the vehicle when normally operating the vehicle;
   wherein said camera module is disposed at the side portion of the vehicle so that images of the exterior scene occurring to the side and rear of the vehicle are reflected off of said reflective element and image data representative of the reflected images is captured by said camera; and
   wherein said display device displays images derived from the captured image data representative of the reflected images so as to provide a sideward and rearward field of view to the driver when the driver is viewing said display device.

2. The rearview vision system of claim 1, wherein image data captured by said camera is processed by an image processor to determine presence of an object sideward and rearward of the vehicle.

3. The rearview vision system of claim 2, wherein said image processor processes captured image data such that the displayed images are displayed with reduced image distortion so as to provide a reduced distortion sideward and rearward field of view to the driver of the vehicle.

4. The rearview vision system of claim 2, wherein image data captured by said camera is processed by said image processor for a blind zone detection system of the vehicle.

5. The rearview vision system of claim 1, wherein image data captured by said camera is used for a multi-camera surround view system of the vehicle.

6. The rearview vision system of claim 1, wherein said curved surface of said reflective element comprises a convex curved surface.

7. The rearview vision system of claim 1, wherein said camera module is adjustable to provide a desired field of view of the area generally sideward and rearward of the vehicle.

8. The rearview vision system of claim 1, wherein said camera is adjustable relative to said reflective element to provide a desired field of view of the area generally sideward and rearward of the vehicle.

9. The rearview vision system of claim 1, wherein said camera module is disposed at the side portion of the vehicle such that said camera has its field of view at least partially forward in the direction of forward travel of the vehicle.

10. The rearview vision system of claim 9, wherein said reflective element is disposed forward and outboard of said camera at the side portion of the vehicle.

11. The rearview vision system of claim 10, wherein said field of view of said camera is at least partially sideward towards said reflective element.

12. The rearview vision system of claim 1, wherein said camera module comprises part of an exterior rearview mirror assembly at the side portion of the vehicle.

13. A rearview vision system for a vehicle, the vehicle having a front portion, a driver side portion, a passenger side portion and a rear portion, the driver side portion having at least one driver side entrance door and the passenger side portion having at least one passenger side entrance door, said rearview vision system comprising:
 a camera module disposed at a side portion of the vehicle, the side portion comprising one of the driver side portion of the vehicle and the passenger side portion of the vehicle;
 wherein said camera module comprises a casing disposed at the vehicle body at the side portion of the vehicle;
 wherein said camera module comprises a reflective element disposed in said casing;
 wherein said camera module comprises a camera disposed in said casing and having a field of view that encompasses at least a portion of said reflective element;
 wherein said camera module is disposed at the side portion of the vehicle so that images of the scene occurring to the side and rear of the vehicle are reflected off of said reflective element and image data representative of the reflected images is captured by said camera;
 wherein image data captured by said camera is processed by an image processor, and wherein said image processor processes captured image data and generates an output representative of the reflected images;
 a display device that is viewable by a driver of the vehicle when normally operating the vehicle;
 wherein said display device displays images derived from the output of said image processor so as to provide a sideward and rearward field of view to the driver when the driver is viewing said display device; and
 wherein said image processor adjusts processing of captured image data to adjust the displayed sideward and rearward field of view provided to the driver.

14. The rearview vision system of claim 13, wherein said reflective element comprises a convex curved surface viewed by said camera to provide a wide angle field of view of the area sideward and rearward of the vehicle.

15. The rearview vision system of claim 13, wherein image data captured by said camera is processed by said image processor for a blind zone detection system of the vehicle.

16. The rearview vision system of claim 13, wherein said camera module is disposed at the side portion of the vehicle such that said camera has its field of view at least partially forward in the direction of forward travel of the vehicle, and wherein said reflective element is disposed forward and outboard of said camera at the side portion of the vehicle, and wherein said field of view of said camera is at least partially sideward towards said reflective element.

17. A rearview vision system for a vehicle, the vehicle having a front portion, a driver side portion, a passenger side portion and a rear portion, the driver side portion having at least one driver side entrance door and the passenger side portion having at least one passenger side entrance door, said rearview vision system comprising:
 a camera module disposed at a side portion of the vehicle, the side portion comprising one of the driver side portion of the vehicle and the passenger side portion of the vehicle;
 wherein said camera module comprises a casing disposed at the vehicle body at the side portion of the vehicle;
 wherein said camera module comprises a reflective element disposed in said casing;
 wherein said camera module comprises a camera disposed in said casing and having a field of view that encompasses at least a portion of said reflective element;
 wherein said camera module is disposed at the side portion of the vehicle so that images of the scene occurring to the side and rear of the vehicle are reflected off of said reflective element, and wherein image data representative of the reflected images is captured by said camera;
 a display device that is viewable by a driver of the vehicle when normally operating the vehicle;
 wherein said display device displays images derived from the captured image data representative of the reflected images so as to provide a sideward and rearward field of view to the driver when the driver is viewing said display device; and
 wherein said rearview vision system is operable to adjust said camera module to adjust the field of view provided to the driver.

18. The rearview vision system of claim 17, wherein said rearview vision system is operable to adjust an orientation of said camera relative to said reflective element, and wherein, when the orientation of said camera is adjusted relative to said reflective element so as to provide a generally downward field of view, image data captured by said camera is used for a multi-camera surround view system of the vehicle, and wherein, when the orientation of said camera is adjusted relative to said reflective element to provide a generally rearward field of view, image data captured by said camera is processed by an image processor for a blind zone detection system of the vehicle.

19. The rearview vision system of claim 17, wherein said rearview vision system, responsive to detection of an object at the side lane adjacent to the vehicle, adjusts said camera module to display the detected object.

20. The rearview vision system of claim 19, wherein said rearview vision system adjusts said camera module to display the detected object responsive to actuation of a turn signal indicator towards that side of the vehicle.

* * * * *

UNITED STATES PATENT AND TRADEMARK OFFICE
CERTIFICATE OF CORRECTION

| | |
|---|---|
| PATENT NO. | : 10,384,610 B2 |
| APPLICATION NO. | : 15/810207 |
| DATED | : August 20, 2019 |
| INVENTOR(S) | : Michael J. Baur |

It is certified that error appears in the above-identified patent and that said Letters Patent is hereby corrected as shown below:

In the Specification

Column 3
Line 22, "do versus the image height $d_2$ or:" should be --$d_0$ versus the image height $d_2$ or:--
Line 56, "function of do and is not constant." should be --function of $d_0$ and is not constant.--

Column 4
Line 25, "do will change as a function of the reflector." should be --$d_0$ will change as a function of the reflector--

Signed and Sealed this
Seventeenth Day of September, 2019

Andrei Iancu
*Director of the United States Patent and Trademark Office*